United States Patent [19]

Amemoto et al.

[11] Patent Number: 5,019,623
[45] Date of Patent: May 28, 1991

[54] PROCESS FOR PRODUCING GRAFTED ALKYD RESIN

[75] Inventors: Mashide Amemoto; Hikaru Watanabe, both of Kumatori; Akio Shoji, Kishiwada, all of Japan

[73] Assignee: Dainippon Ink and Chemicals, Inc., Tokyo, Japan

[21] Appl. No.: 385,396

[22] Filed: Jul. 27, 1989

Related U.S. Application Data

[62] Division of Ser. No. 104,950, Oct. 6, 1987, abandoned.

[30] Foreign Application Priority Data

Oct. 8, 1986 [JP] Japan ................................ 61-238014
Mar. 12, 1987 [JP] Japan ................................ 62-55318

[51] Int. Cl.$^5$ .............................................. C08G 63/91
[52] U.S. Cl. ......................................... 525/7.3; 525/7;
525/7.1; 525/10; 525/28; 525/37; 525/38;
525/43; 525/46
[58] Field of Search ...................... 525/7, 7.3, 7.4, 37,
525/38, 43, 46, 28, 31, 10

[56] References Cited

U.S. PATENT DOCUMENTS

| 2,503,209 | 4/1950 | Nyquist | 525/28 |
| 2,862,898 | 12/1958 | Chapin | 525/7 |
| 3,991,230 | 11/1976 | Dickie et al. | 427/44 |
| 3,992,477 | 11/1976 | Dickie et al. | 427/44 |
| 4,278,575 | 7/1981 | Nakamura | 525/46 |

FOREIGN PATENT DOCUMENTS

| 0006935 | 5/1979 | European Pat. Off. . | |
| 2559049 | 7/1976 | Fed. Rep. of Germany . | |
| 2291224 | 6/1976 | France . | |
| 57-202354 | 12/1982 | Japan | 565/46 |
| 2038846A | 7/1980 | United Kingdom . | |

OTHER PUBLICATIONS

Martens, C. R., *Alkyd Resins*, pp. 105-115, Reinhold Publishing Corp., NY, 1961.
Chemical Abstracts, 99:55129y.

*Primary Examiner*—Patricia Short
*Attorney, Agent, or Firm*—Sherman and Shalloway

[57] ABSTRACT

A process for producing a grafted alkyd resin, which comprises graft-copolymerizing an alkyd resin with 0.01 to 5.0% by weight of at least one vinyl monomer selected from the group consisting of nitrogen-containing vinyl monomers and phosphorus-containing vinyl monomers.

10 Claims, No Drawings

PROCESS FOR PRODUCING GRAFTED ALKYD RESIN

This is a division of application Ser. No. 104,950, filed Oct. 6, 1987, now abandoned.

This invention relates to an alkyd resin for use in paints. More specifically, it relates to a process for producing an alkyd resin having very good pigment dispersibility which can be used without substantially adding a pigment dispersing agent.

No conventional paint resins have complete pigment dispersibility, and surface-active agents, silicone compounds, etc. have previously been added to these resins in an attempt to improve pigment dispersibility.

Paints containing alkyd resins as vehicles generally have better dispersibility of organic pigments and carbon black than paints containing other vehicles such as acrylic resins, but still have insufficient pigment dispersibility. Moreover, none of them are satisfactory from the standpoint of floating at the time of color mixing.

The present inventors have made extensive investigations in order to eliminate the defects of the prior art such as poor pigment dispersibility and floating during color mixing. These investigations have led to the discovery that when an alkyd resin is graft-copolymerized with a vinyl monomer containing a nitrogen atom and/or a vinyl monomer containing a phosphorus atom, the pigment dispersibility of the alkyd resin is improved and floating in color mixing is completely eliminated.

Thus, according to this invention, there is provided a process for producing a grafted alkyd resin having excellent pigment dispersibility, which comprises graft-copolymerizing an alkyd resin with 0.01 to 5.0% by weight of a nitrogen-containing vinyl monomer and/or a phosphorus-containing vinyl monomer.

The alkyd resin used in the process of this invention may be any alkyd resin which has a site of unsaturation capable of being graft-copolymerized with the nitrogen-containing vinyl monomer and/or the phosphorus-containing vinyl monomer. It may, for example, be a short-oil alkyd resin, a medium-oil alkyd resin, a long-oil alkyd resin, a phenolic resin-modified alkyd resin, an epoxy-modified alkyd resin, or an oil-free alkyd resin.

Usually, oils and fats, fatty acids of oils and fats, mono- or poly-basic acids, polyhydric alcohols, modifiers, etc. are used as starting materials for the production of such alkyd resins.

Examples of the oils and fats and the fatty acids of oils and fats include oils and fats such as linseed oil, soybean oil, tung oil, rice bran oil, coconut oil, palm oil, safflower oil, fish oils, hydrogenated fish oils, castor oils and dehydrated castor oil, polymerized oils such as dehydrated castor oil, linseed oil and tung oil, fatty acids of the above oils and fats, and tall oil fatty acid.

Examples of the mono- or poly-basic acids are phthalic anhydride, phthalic acid, isophthalic acid, terephthalic acid, Het acid, trimellitic acid, pyromellitic acid, succinic anhydride, succinic acid, oxalic acid, adipic acid, sebacic acid, benzoic acid, p-t-butylbenzoic acid, p-hydroxybenzoic acid and rosin, and hydrogenated products and methyl esters of these acids.

Examples of the polyhydric alcohols include ethylene glycol, propylene glycol, neopentyl glycol, 1,6-hexanediol, 1,3-butyleneglycol, hydrogenated bisphenol A, trimethylolpropane, trimethylolethane, glycerin, pentaerythritol and 1,4-cyclohexanedimethanol; alkylene oxide adducts of these; Cardula E; and adducts of the above alcohols with bisphenol-type, alicyclic and phenolic epoxy compounds.

Desirably, the alkyd resin used in this invention has a site of unsaturation originated from an oil or fat, which can be graft-copolymerized with the N-containing vinyl monomer and/or the P-containing vinyl monomer to be described hereinafter.

The following methods are available to secure the site of unsaturation for the grafting reaction in the alkyd resin.

(i) An unsaturated dicarboxylic acid such as maleic acid, fumaric acid or itaconic acid is used as a starting material for production of the alkyd resin. Alternatively, a dicarboxylic acid anhydride is reacted with the hydroxyl groups of the alkyd resin to introduce unsaturated groups. These methods are most preferred in view of pigment dispersibility which is to be improved by the present invention. The amount of the unsaturated dicarboxylic acid used is 0.01 to 5% by weight, preferably 0.05 to 3% by weight. If it is less than 0.01% by weight, the effect of the unsaturated dicarboxylic acid is difficult to expect. If it exceeds 5% by weight, the resin comes to have a very high viscosity and the stability of a paint containing the resulting resin is reduced.

(ii) An isocyanate group-containing vinyl monomer represented by the following general formula

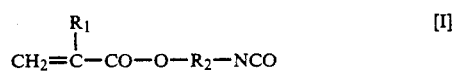

wherein $R_1$ represents a hydrogen atom or a methylol group, and $R_2$ represents an alkyl group having 2 to 5 carbon atoms, is caused to add to the remaining hydroxyl groups of the alkyd resin.

(iii) Glycidyl (meth)acrylate is caused to add to the remaining carboxyl groups of the alkyd resin.

The above methods (i), (ii) and (iii) are typical examples of the method of introducing an unsaturated group into the alkyd resin. By such methods, the alkyd resin can be graft-copolymerized with the N-containing vinyl monomer and/or P-containing vinyl monomer. Needless to say, the present invention is not limited to these specific methods of introducing the unsaturated groups.

Examples of the N-containing vinyl monomer to be graft-copolymerized with the alkyd resin include N,N-dialkylaminoalkyl (meth)acrylates, N,N-dialkylaminoalkyl (meth)acrylamides, (meth)acrylamide, N-methylol (meth)acrylamide, N,N-dialkyl (meth)acrylamides, diacetone (meth)acrylamide, N-vinylmorpholine, N-alkoxymethyl (meth)acrylamides, N-vinylpyrrolidone, acrylonitrile, N,N-dialkylaminoalkyl maleimides, vinylimidazole, and derivatives of these. The amount of the N-containing vinyl monomer used is 0.01 to 5% by weight, preferably 0.05 to 3% by weight. If it is less than 0.01% by weight, the effect of this vinyl monomer cannot be expected. If it exceeds 5% by weight, the stability of a paint containing the resulting product is undesirably reduced.

Grafting of the N-containing vinyl monomer to the alkyd resin may be carried out in accordance with an ordinary grafting reaction. Most simply and conveniently, it is carried out by reacting the N-containing vinyl monomer with the alkyd resin having an unsaturated group to be involved in the grafting reaction with or without a radical polymerization initiator.

Typical examples of the P-containing vinyl monomer to be reacted with the alkyd resin are compounds of the general formula

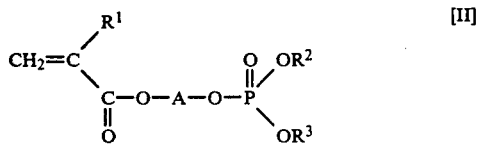

[II]

wherein $R^1$ represents a hydrogen atom or a methyl group, $R^2$ and $R^3$ each represent a hydrogen atom, an alkyl group having 1 to 8 carbon atoms, an alkyl ether group having 2 to 8 carbon atoms, an aryl group having 6 to 12 carbon atoms, or an aralkyl group having 7 to 14 carbon atoms, and A represents an alkylene group having 1 to 14 carbon atoms, or a $C_2$-$C_{14}$ alkylene group containing at least one ether linkage.

Typical examples are mono(2-methacryloyloxyethyl) acid phosphate, diphenyl(2-methacryloyloxyethyl) phosphate, and dioctyl(2-methacryloyloxyethyl) phosphate. The amount of the P-containing vinyl monomer is 0.01 to 5% by weight, preferably 0.05 to 3% by weight, based on the weight of the alkyd resin. If it is less than 0.01% by weight, the effect of the P-containing vinyl monomer cannot be expected. If it exceeds 5% by weight it undesirably reduces the stability of a paint containing the resulting product.

Grafting of the P-containing vinyl monomer to the alkyd resin may be carried out in accordance with an ordinary grafting reaction. Most simply, it is carried out by reacting the P-containing vinyl monomer with the alkyd resin containing an unsaturated group to be involved in the grafting reaction with or without a radical polymerization initiator.

Vinyl monomers other than the aforesaid N-containing vinyl monomers and the P-containing vinyl monomers may also be used together in the graft-copolymerization in this invention. Typical examples of the other vinyl monomers include styrene, styrene derivatives such as p-t-butylstyrene, alkyl acrylates such as methyl acrylate, ethyl acrylate and butyl acrylate, alkyl methacrylates such as methyl methacrylate, ethyl methacrylate and butyl methacrylate, acid monomers such as acrylic acid and methacrylic acid, and hydroxyalkyl (meth)acrylates such as 2-hydroxyethyl (meth)acrylate. The amount of the other monomer used is not more than 5.0% by weight, preferably not more than 3.0% by weight. If it is used in an amount exceeding 5% by weight, the compatibility of the resulting grafted alkyd resin with another resin is undesirably degraded.

The graft-copolymerization in accordance with this invention may be carried out in the presence of a polymerization initiator such as azobisisobutyronitrile, benzoyl peroxide, t-butyl perbenzoate, t-butyl hydroperoxide, di-t-butyl hydroperoxide and cumene hydroperoxide.

The graft-copolymerization reaction may be carried out without diluting the alkyd resin with an organic solvent. Generally, however, it is carried out in a solution of the alkyd resin in an organic solvent. Examples of the organic solvent are aromatic solvents such as xylene, toluene and "Solvesso 100" and "Solvesso 150" (products of Exxon, U.S.A.), esters such as ethyl acetate, butyl acetate and Cellosolve acetate, ketones such as methyl ethyl ketone and methyl isobutyl ketone, and mixed aliphatic, aromatic and/or alicyclic hydrocarbons such as "Haws" (an aromatic-aliphatic hyrocarbon mixture, a product of Shell Chemical Co., Switzerland) and mineral spirit. They may be used singly or in combination.

The grafted alkyd resin obtained by the process of this invention desirably has a number average molecular weight of 500 to 20,000, preferably 1,000 to 8,000.

The grafted alkyd resin obtained by the process of this invention may be formulated into a lacquer together with another vinyl resin or nitrocellulose. It may also be formulated into a baking-type paint by including a curing agent such as a polyisocyanate resin, an amino resin or an epoxy resin.

The grafted alkyd resin obtained by using a drying oil or a semi-drying oil may be formulated into an air-drying type paint by adding a dryer such as a cobalt-, zirconium-, lead- or manganese-containing organic metal salt.

It should be understood that the grafted alkyd resin obtained by the process of this invention may be used together with conventional paint additives or curing accelerators effective for the aforesaid curing agents.

The following examples illustrate the present invention more specifically. It should be understood that the invention is in no way limited to these examples unless it departs from the technical concept herein described. All parts and percentages in these examples are by weight.

REFERENTIAL EXAMPLE 1

Preparation of an alkyd resin

A four-necked flask equipped with a stirring rod, a thermometer, a condenser, a nitrogen introducing tube and a heater was charged with 370 parts of rice bran fatty acid, 425 parts of phthalic anhydride, 100 parts of pentaerythritol, 150 parts of glycerin and 50 parts of ethylene glycol. In an atmosphere of nitrogen, the above compounds were heated to 180° C. and maintained at this temperature for 2 hours. The temperature was further elevated to 230° C. over the course of 1.5 hours, and the mixture was maintained at this temperature. The reaction was carried out until the acid value of the reaction mixture reached 8.5. After the reaction, 530 parts of xylene was added.

The resulting resin solution had a non-volatile content of 65.0%, a viscosity (Gardner, at 25° C.) of $Z_8$, and an acid value of 5.0. It is referred to as "resin solution A".

REFERENTIAL EXAMPLE 2

Preparation of an alkyd resin

The same reactor as used in Referential Example 1 was charged with 250 parts of isophthalic acid, 380 parts of adipic acid, 150 parts of trimethylolpropane, 170 parts of neopentyl glycol and 200 parts of 1,6-hexanediol. In a nitrogen atmosphere, these compounds were heated to 160° C., and the temperature was further raised to 220° C. over the course of 4 hours. The mixture was maintained at this temperature, and the reaction was carried out until the acid value of the reaction mixture reached 7. After the reaction, the reaction mixture was cooled to 180° C., and 830 parts of xylene and 150 parts of Cellosolve acetate were added.

The resulting resin solution had a non-volatile content of 50%, a viscosity (Gardner, at 250° C.) of X and an acid value of 3.0. It is referred to as "resin solution B".

REFERENTIAL EXAMPLE 3

Preparation of an alkyd resin The same reactor as used in Referential Example 1 was charged with 400 parts of coconut oil, 80 parts of trimethylolpropane and 0.2 part of lithium hydroxide, and these compounds were heated to 220° C. and maintained for 1 hour at this temperature in an atmosphere of nitrogen.

The reaction mixture was then cooled to 180° C., and 190 parts of isophthalic acid, 180 parts of phthalic anhydride, 100 parts of trimethylolpropane, 100 parts of pentaerythritol and 15 parts of fumaric acid were added. The mixture was heated to 230° C., and maintained at this temperature until the acid value of the reaction mixture reached 11. After the reaction, the reaction mixture was cooled to 180° C., and 650 parts of xylene was added.

The resulting resin solution had a non-volatile content of 60.0%, a viscosity (Gardner, at 25° C.) of T and an acid value of 6.0. It is referred to as "resin solution C".

REFERENTIAL EXAMPLE 4

Preparation of an alkyd resin

The same reactor as used in Referential Example 1 was charged with 400 parts of linseed oil, 100 parts of dehydrated castor oil, 50 parts of benzoic acid, 90 parts of pentaerythritol, and 0.5 part of lithium hydroxide. These compounds were heated to 240° C. in an atmosphere of nitrogen and maintained at this temperature for 1 hour.

The reaction mixture was then cooled to 180° C., and 300 parts of phthalic anhydride and 100 parts of pentaerythritol were added. The temperature was elevated to 230° C., and the mixture was maintained at this temperature until the acid value of the reaction mixture reached 8.0. After the reaction, the reaction mixture was cooled to 180° C. and 650 parts of "Haws" was added.

The resulting resin solution had a non-volatile content of 60.0%, a viscosity (Gardner, at 25° C.) of V-W, and an acid value of 4.4. It is referred to as "resin solution D".

REFERENTIAL EXAMPLE 5

Preparation of an alkyd resin

By repeating the operation of Referential Example 4 except that the amount of linseed oil was changed to 500 parts and dehydrated castor oil was not used, a resin solution having a non-volatile content of 60.0%, a viscosity (Gardner, at 25° C.) of V and an acid value of 4.0 was obtained. It is referred to as "resin solution E".

EXAMPLE 1

The same reactor as used in Referential Example 1 was charged with 1000 parts of the resin solution A obtained in Referential Example 1, 5.0 parts of 2-methacryloyloxyethyl acid phosphate, 88.0 parts of n-butanol and 5.0 parts of di-t-butyl hydroperoxide. After good stirring, the mixture was heated to 118° C., and maintained at this temperature for 4 hours to perform graft-copolymerization. After the reaction, the reaction mixture was cooled to form a resin solution.

The resulting resin solution had a non-volatile content of 60.0%, a viscosity (Gardner, at 25° C.) of $Z_1$-$Z_2$ and an acid value of 4.5. It is referred to as "resin solution RS-1".

EXAMPLE 2

The same reactor as used in Example 1 was charged with 1000 parts of the resin solution A obtained in Referential Example 1 and 3.0 parts of maleic anhydride. They were stirred and heated to 135° C. The mixture was maintained at this temperature for 1 hour, and then cooled to below 80° C. Then, 106 parts of n-butanol, 10 parts of styrene, 3.0 parts of 2-methacryloyloxyethyl acid phosphate, 3.0 parts of dimethylaminoethyl methacrylate and 5.0 parts of di-t-butyl hydroperoxide were added. The mixture was well stirred, heated to 118° C. and maintained at this temperature for 6 hours to continue graft-copolymerization. After the reaction, the reaction mixture was cooled to form a resin solution.

The resulting resin solution had a non-volatile content of 60.0%, a viscosity (Gardner, at 25° C.) of $Z_2$ and an acid value of 6.0. It is referred to as "resin solution RS-2".

EXAMPLE 3

The same reactor as used in Referential Example was charged with 1000 parts of the resin solution B obtained in Referential Example 2, 2.0 parts of glycidyl methacrylate, 10 parts of styrene, 5 parts of methyl methacrylate, 3.0 parts of diphenyl(2-methacryloyloxyethyl) phosphate, 12 parts of xylene and 5.0 parts of di-t-butyl hydroperoxide. These compounds were well stirred, and the mixture was heated to 140° C. and maintained at this temperature for 5 hours to continue graft-copolymerization. After the reaction, the reaction mixture was cooled to form a resin solution.

The resulting resin solution had a non-volatile content of 50.0%, a viscosity (Gardner, at 25° C.) of Z-$Z_1$ and an acid value of 3.3. It is referred to as "resin solution RS-3".

EXAMPLE 4

The same reactor as used in Referential Example 1 was charged with 1000 parts of the resin solution B obtained in Referential Example 2, 5 parts of isocyanatoethyl methacrylate, 2.5 parts of 2-methacryloyloxyethyl acid phosphate, 1.5 parts of dimethylaminopropyl acrylate, 5.0 parts of di-t-butyl hydroperoxide and 8 parts of xylene. They were well stirred and the mixture was heated to 135° C. and maintained at this temperature for 5 hours to continue graft-copolymerization. After the reaction, the reaction mixture was cooled to obtain a resin solution.

The resulting resin solution had a non-volatile content of 50.0%, a viscosity (Gardner, at 25° C.) of $Z_1$-$Z_2$ and an acid value of 3.3. It is referred to as "resin solution RS-4".

EXAMPLE 5

The same reactor as used in Referential Example 1 was charged with 1000 parts of the resin solution B obtained in Referential Example 2, 2.0 parts of maleic anhydride, 2.5 parts of 2-methacryloyloxyethyl acid phosphate, 4.5 parts of styrene, 6 parts of xylene and 3.0 parts of di-t-butyl hydroperoxide. They were well stirred, and the mixture was heated to 135° C. and maintained at this temperature for 5 hours to continue graft-copolymerization. After the reaction, the reaction mixture was cooled to form a resin solution.

The resulting resin solution had a non-volatile content of 50%, a viscosity (Gardner at 25° C.) of Y and an acid value of 4.2. It is referred to as "resin solution RS-5".

EXAMPLE 6

The same reactor as used in Referential Example 1 was charged with 1000 parts of the resin solution C obtained in Referential example 3, 3.0 parts of styrene, 2.5 parts of 2-methacryloloxyethyl acid phosphate, 5 parts of butyl Cellosolve and 3.0 parts of di-t-butyl hydroperoxide, and they were well stirred. The mixture was then heated to 135° C., and maintained at this temperature for 5 hours to continue graft-copolymerization. After the reaction, the reaction mixture was cooled to form a resin solution.

The resulting resin solution had a non-volatile content of 50%, a viscosity (Gardner, at 25° C.) of V-W and an acid value of 6.5. It is referred to as "resin solution RS-6".

EXAMPLE 7

The same reactor as used in Referential Example 1 was charged with 1000 parts of the resin solution D obtained in Referential Example 4, 2.5 parts of 2-methacryloyloxyethyl acid phosphate, 3 parts of xylene and 3.0 parts of di-t-butyl hydroperoxide, and they were well stirred. The mixture was then heated to 145° C. and maintained at this temperature for 5 hours to continue graft-copolymerization. After the reaction, the reaction mixture was cooled to form a resin solution.

The resulting resin solution had a non-volatile content of 50.0%, a viscosity (Gardner, at 25° C.) of W and an acid value of 4.0. It is referred to as "resin solution RS-7".

EXAMPLE 8

The same reactor as used in Referential Example 1 was charged with 1000 parts of the resin solution A obtained in Referential Example 1, 5.0 parts of dimethylaminoethyl methacrylate, 5.0 parts of xylene and 5.0 parts of di-t-butyl hydroperoxide, and they were well stirred. The mixture was then heated to 135° C. and maintained at this temperature for 4 hours to continue graft-copolymerization. After the reaction, the reaction mixture was cooled to obtain a resin solution.

The resulting resin solution had a non-volatile content of 60.0%, a viscosity (Gardner, at 25° C.) of $Z_3$ and an acid value of 3.9. It is referred to as "resin solution RS-8".

EXAMPLE 9

The same reactor as used in Referential Example 1 was charged with 1000 parts of the resin solution A obtained in Referential Example 1, 5 parts of styrene, 5 parts of n-butyl methacrylate, 5 parts of fumaric acid, 3.0 parts of N,N-dimethylaminoethyl methacrylamide, 5.0 parts of di-t-butyl hydroperoxide and 12 parts of xylene, and they were well stirred. The mixture was heated to 135° C., and maintained at this temperature for 5 hours to continue graft-copolymerization. After the reaction, the reaction mixture was cooled to form a resin solution.

The resulting resin solution had a non-volatile content of 60%, a viscosity (Gardner, at 25° C.) of $Z_3$–$Z_4$ and an acid value of 6.0. It is referred to as "resin solution RS-9".

EXAMPLE 10

The same reactor as used in Referential Example 1 was charged with 1000 parts of the resin solution B obtained in Referential Example 2, 2.0 parts of glycidyl methacrylate, 10 parts of styrene, 5 parts of methyl methacrylate, 3.0 parts of N,N-dimethylaminoethyl maleimide, 12 parts of xylene and 5.0 parts of di-t-butyl hydroperoxide, and they were well stirred. The mixture was heated to 135° C., and maintained at this temperature for 5 hours. After the reaction, the reaction mixture was cooled to form a resin solution.

The resulting resin solution had a non-volatile content of 50.0%, a viscosity (Gardner, at 25° C.) of Z and an acid value of 3.2. It is referred to as "resin solution RS-10".

EXAMPLE 11

The same reactor as used in Referential Example 1 was charged with 1000 parts of the resin solution B obtained in Referential Example 2, 5 parts of isocyanatoethyl methacrylate, 2.5 parts of dimethylaminoethyl methacrylate, 5 parts of di-t-butyl hydroperoxide and 8 parts of xylene, and they were well stirred. The mixture was heated to 135° C., and maintained at this temperature for 5 hours. After the reaction, the reaction mixture was cooled to form a resin solution.

The resulting resin solution had a non-volatile content of 50.0%, a viscosity (Gardner, at 25° C.) of $Z_1$ and an acid value of 3.0. It is referred to as "resin solution RS-11".

EXAMPLE 12

The same reactor as used in Referential Example 1 was charged with 1000 parts of the resin solution B obtained in Referential Example 2, 2.0 parts of maleic anhydride, 2.5 parts of dimethylaminoethyl methacrylate, 4.5 parts of styrene, 6 parts of xylene and 3.0 parts of di-t-butyl hydroperoxide, and they were well stirred. The mixture was heated to 135° C., and maintained at this temperature for 5 hours. After the reaction, the reaction mixture was cooled to form a resin solution.

The resulting resin solution had a non-volatile content of 50.0%, a viscosity (Gardner, at 25° C.) of Y and an acid value of 4.2. It is referred to as "resin solution RS-12".

EXAMPLE 13

The same reactor as used in Referential Example 1 was charged with 1000 parts of the resin solution C obtained in Referential Example 3, 3.5 parts of styrene, 2.5 parts of dimethylaminoethyl methacrylate and 3.0 parts of di-t-butyl hydroperoxide, and they were well stirred. The mixture was heated to 135° C., and maintained at this temperature for 5 hours. After the reaction, the reaction mixture was cooled to form a resin solution.

The resulting resin solution had a non-volatile content of 50%, a viscosity (Gardner, at 25° C.) of W and an acid value of 3.2. It is referred to as "resin solution RS-13".

EXAMPLE 14

The same reactor as used in Referential Example 1 was charged with 1000 parts of the resin solution E obtained in Referential Example 5, 2.5 parts of dimethylaminoethyl methacrylate, 3 parts of xylene and 3.0 parts of di-t-butyl hydroperoxide, and they were well stirred. The mixture was heated to 135° C., and maintained at this temperature for 5 hours. After the reaction, the reaction mixture was cooled to form a resin solution.

The resulting resin solution had a non-volatile content of 50.0%, a viscosity (Gardner, at 25° C.) of W and an acid value of 3.0. It is referred to as "resin solution RS-14".

TEST EXAMPLE

The dispersibility of a pigment was evaluated on the resin solutions obtained in Referential Examples 1 to 4 and Examples 1 to 7. Each of the pigments shown in Table 1 was added to 100 parts of each of the resin solutions so as to provide each of the pigment contents (PWC) shown in Table 1. Xylene (30 parts) and 100 parts of glass beads were added, and they were kneaded for 1 hour by a sand mill. Subsequently, the glass beads were removed by filtration to form a color base (Comparative Examples 1 to 4 and Examples 1 to 7) In Comparative Examples 1 to 3 and Examples 1 to 6, the color base was diluted with 30 parts of a thinner (xylene:n-butanol=7:3 by weight) In Comparative Example 4 and Example 7, the color base was diluted with xylene. The blending property and the occurrence of pigment flocculation were examined using these diluted solutions.

Each of the diluted solution was coated on a tin plate and left to stand at room temperature for one day. Then, the gloss of the coated film was examined.

The results are summarized in Table 1 as data on the dispersibility of original colors.

A baking-type paint was prepared by mixing each of the above diluted solutions (Comparative Examples 1 to 3 and Examples 1 to 6) and "Super Beckamin G-821-60" (isobutyl etherified melamin resin made by Dainippon Ink and Chemicals, Inc.) at a solids ratio of 7:3 by weight.

Then, 20 parts of each of black, red and green paints was added to 80 parts of each of the resulting white paints, and the mixture was spray-coated and then flow-coated on the spray-coated film, and baked at 130° C. for 20 minutes. The color difference between the spray-coated portion and the flow-coated portion was examined. The results are also shown in Table 1.

In Comparative Example 4 and Example 7, 1.0% of cobalt naphthenate, 2.0% of lead naphthenate and 0.5% of methylethyl ketoxime, based on the resin solid, of each of the diluted solutions, were added to each of the diluted solutions. The mixture was coated on a tin plate and after standing for one day, the color difference was examined. The results are shown in Table 1.

The standards of evaluation were as follows:

Blending properties

: Blending was easy
: Slightly thickened during blending
Δ: Slightly gel-like, and the blending was somewhat difficult
X: Gel-like, and blending was difficult

Occurrence of pigment flocculation

: Not flocculated
: Slightly thickened but not flocculated
Δ: Slightly flocculated
X: Flocculated

Color difference

A mixture of 8 parts of a white paint and 2 parts of a black, red or green paint was spray-coated, set for 10 minutes, and then flow-coated. The color difference between the spray-coated portion and the flow-coated portion was determined.

Gloss

60° specular reflectance
The pigments used were as follows:
White: "Tipaque R-820" (rutile-type titanium dioxide produced by Ishihara Sangyo Kaisha Ltd.)
Black: "Mitsubishi Carbon black MA-100" (carbon black produced by Mitsubishi Chemical Industries Ltd.)
Red: "Symuler Red 3037" (organic pigment produced by Dainippon Ink and Chemicals Inc.)
Green: "Fastogen Green GP" (organic pigment produced by Dainippon Ink and Chemicals Inc.)

TABLE 1

| | Resin solution used | Pigment | PWC (%) | Blending property | Pigment flocculation | Gloss | Color difference 8 parts of white paints and 2 parts of black paint | 8 parts of white paint and 2 parts of red paint | 8 parts of white paint and 2 parts of green paint |
|---|---|---|---|---|---|---|---|---|---|
| Comparative Example 1 | A | white | 50 | | | 81 | | — | — |
| | | black | 10 | Δ | X | 50 | 5.0 | — | — |
| | | red | 15 | X | X | 49 | — | 11.3 | — |
| | | green | 10 | X | X | 44 | — | — | 3.2 |
| Example 1 | RS-1 | white | 50 | | | 89 | | | |
| | | black | 10 | | Δ | 82 | 1.3 | — | — |
| | | red | 15 | | | 79 | — | 1.3 | — |
| | | green | 10 | | | 80 | — | — | 0.4 |
| Example 2 | RS-2 | white | 50 | | | 93 | | | |
| | | black | 10 | | | 90 | 0.1 | — | — |
| | | red | 15 | | | 88 | — | 1.0 | — |
| | | green | 10 | | | 82 | — | — | 0.2 |
| Comparative Example 2 | B | white | 50 | | | 76 | 4.0 | | |
| | | black | 10 | X | X | 52 | | | |
| Example 3 | RS-3 | white | 50 | | | 91 | 2.2 | | |
| | | black | 10 | | | 82 | | | |
| Example 4 | RS-4 | white | 50 | | | 92 | 0.2 | | |
| | | black | 10 | | | 91 | | | |
| Example 5 | RS-5 | white | 50 | | | 88 | 0.2 | | |
| | | black | 10 | | | 88 | | | |
| Comparative Example 3 | C | white | 50 | | | 82 | 5.9 | | |
| | | black | 10 | Δ | X | 46 | | | |
| Example 6 | RS-6 | white | 50 | | | 91 | 0.1 | | |

TABLE 1-continued

| | Resin solution used | Pigment | PWC (%) | Blending property | Pigment flocculation | Gloss | 8 parts of white paints and 2 parts of black paint | 8 parts of white paint and 2 parts of red paint | 8 parts of white paint and 2 parts of green paint |
|---|---|---|---|---|---|---|---|---|---|
| | | black | 10 | | | 90 | | | |
| Comparative Example 4 | D | white | 50 | | | 72 | 4.9 | | |
| | | black | 10 | Δ | X | 51 | | | |
| Example 7 | RS-7 | white | 50 | | | 92 | 0.2 | | |
| | | black | 10 | | | 84 | | | |

In the same way as above, pigment dispersibility (i.e., blending properties and pigment flocculation), the gloss of coated films and color differences of paints were evaluated on the resin solutions obtained in Examples 8 to 14 and Referential Examples 1 to 3 and 5.

Examples 8 to 13 were carried out in the same way as in Examples 1 to 6. Comparative Examples 5 to 7 were carried out in the same way as in Comparative Examples 1 to 3. Example 14 was carried out in the same way as in Example 7. Comparative Example 8 was carried out in the same way as in Comparative Example 4.

The results are summarized in Table 2.

TABLE 2

| | Resin solution used | Pigment | PWC (%) | Blending property | Pigment flocculation | Gloss | 8 parts of white paints and 2 parts of black paint | 8 parts of white paint and 2 parts of red paint | 8 parts of white paint and 2 parts of green paint |
|---|---|---|---|---|---|---|---|---|---|
| Comparative Example 5 | A | white | 50 | | | 80 | | | |
| | | black | 10 | Δ | X | 49 | 5.2 | | |
| | | red | 15 | X | X | 45 | | 10.4 | |
| | | green | 15 | X | X | 44 | | | 3.0 |
| Example 8 | RS-8 | white | 50 | | | 81 | | | |
| | | black | 10 | | Δ | 82 | 1.9 | | |
| | | red | 15 | | | 79 | | 1.23 | |
| | | green | 15 | | | 80 | | | 0.5 |
| Example 9 | RS-9 | white | 50 | | | 91 | | | |
| | | black | 10 | | | 90 | 0.2 | | |
| | | red | 15 | | | 86 | | | |
| | | green | 15 | | | 88 | | | |
| Comparative Example 6 | B | white | 50 | | | 81 | 4.9 | | |
| | | black | 10 | X | X | 41 | | | |
| Example 10 | RS-10 | white | 50 | | | 90 | 4.2 | | |
| | | black | 10 | | | 90 | | | |
| Example 11 | RS-11 | white | 50 | | | 91 | 0.15 | | |
| | | black | 10 | | | 89 | | | |
| Example 12 | RS-12 | white | 50 | | | 90 | 0.21 | | |
| | | black | 10 | | | 91 | | | |
| Comparative Example 7 | C | white | 50 | | | 80 | 5.0 | | |
| | | black | 10 | Δ | X | 42 | | | |
| Example 13 | RS-13 | white | 50 | | | 90 | 0.3 | | |
| | | black | 10 | | | 91 | | | |
| Comparative Example 8 | E | white | 50 | | | 79 | 4.8 | | |
| | | black | 10 | Δ | X | 39 | | | |
| Example 14 | RS-14 | white | 50 | | | 90 | 0.15 | | |
| | | black | 10 | | | 90 | | | |

The results given in Tables 1 and 2 show that the grafted alkyd resins obtained by the process of this invention having the N-containing vinyl monomer and/or the P-containing vinyl monomer grafted thereto have excellent blending and dispersing properties with respect to various pigments. Accordingly, the grafted alkyd resins in accordance with this invention can form coated films having excellent gloss and color difference properties without using a pigment dispersing agent.

Above all, alkyd resins modified with a mixture of the N-containing vinyl monomer and the P-containing vinyl monomer are preferred because they exhibit very good pigment dispersing ability even when a number of pigments are used.

What is claimed is:

1. A grafted alkyd resin produced by graft-copolymerizing an alkyd resin with 0.01 to 5% by weight of at least one vinyl monomer selected from the group consisting of N,N-dialkylaminoalkyl (meth)acrylate, N,N-dialkylaminoalkyl (meth)acrylamide, (meth)acrylamide, N-methylol (meth)acrylamide, N,N-dialkyl (meth)acrylamide, diacetone (meth)acrylamide, N-vinylmorpholine, N-alkaoxymethyl (meth)acrylamide, N-vinylpyrrolidone, N,N-dialkylaminoalkyl malemide, vinylimidazole and phosphorous-containing vinyl monomers, and not more than 5.0% by weight of at least one vinyl monomer other than said nitrogen- and phosphorous-containing vinyl monomers.

2. The grafted resin of claim 1 wherein the amount of said at least one vinyl monomer selected from the group consisting of nitrogen-containing vinyl monomers and phosphorous-containing vinyl monomers is from 0.05 to 3% by weight, based on the weight of the alkyd resin, and the amount of said at least one vinyl monomer other than said nitrogen- and phosphorous-containing vinyl monomers is not more than 3.0% by weight of said alkyd resin.

3. The grafted alkyd resin of claim 1 wherein the alkyd resin is a short-oil alkyd resin, a medium-oil alkyd resin, a long-oil alkyd resin, a phenolic resin-modified alkyd resin, an epoxy-modified alkyd resin or an oil-free alkyd resin.

4. The grafted alkyd resin of claim 1 which comprises said phosphorous-containing vinyl monomer which is a compound represented by the general formula

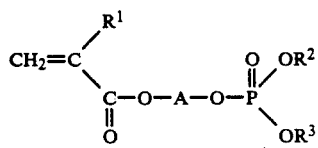

wherein $R^1$ represents a hydrogen atom at a methyl group, $R^2$ and $R^3$ each represent a hydrogen atom, an alkyl group having 1 to 8 carbon atoms, an alkyl ether group having 2 to 8 carbon atoms, an aryl group having 6 to 12 carbon atoms, or an aralkyl group having 7 to 14 carbon atoms, and A represents an alkylene group having 1 to 14 carbon atoms or a $C_2$–$C_{14}$ alkylene group having at least one ether linkage.

5. The grafted alkyd resin of claim 1 which comprises both of said nitrogen-containing vinyl monomer and said phosphorous-containing vinyl monomer.

6. The grafted alkyd resin of claim 1 wherein the grafting sites of the alkyd resin are derived from an oil or fat.

7. The grafted alkyd resin of claim 1 wherein the grafting sites of the alkyd resin are originated from an unsaturated dicarboxylic acid selected from the group consisting of maleic acid, fumaric acid and itaconic acid.

8. The grafted alkyd resin of claim 1 wherein the grafting sites of the alkyd resin are produced by a reaction of the hydroxyl groups of the alkyd resin with a dicarboxylic acid anhydride.

9. The grafted alkyd resin of claim 1 wherein the grafting sites of the alkyd resin are produced by a reaction of the hydroxyl groups of the alkyd resin with an isocyanate group-containing vinyl monomer represented by the following general formula:

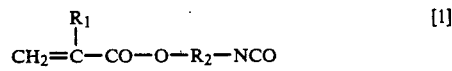

wherein $R_1$ represents a hydrogen atom or a methylol group, and $R_2$ represents an alkyl group having 2 to 5 carbon atoms.

10. The grafted alkyd resin of claim 1 wherein the grafting sites of the alkyd resin are produced by a reaction of the carboxyl groups of the alkyd resin with glycidyl (meth)acrylate.

* * * * *